United States Patent Office 3,210,603
Patented Oct. 5, 1965

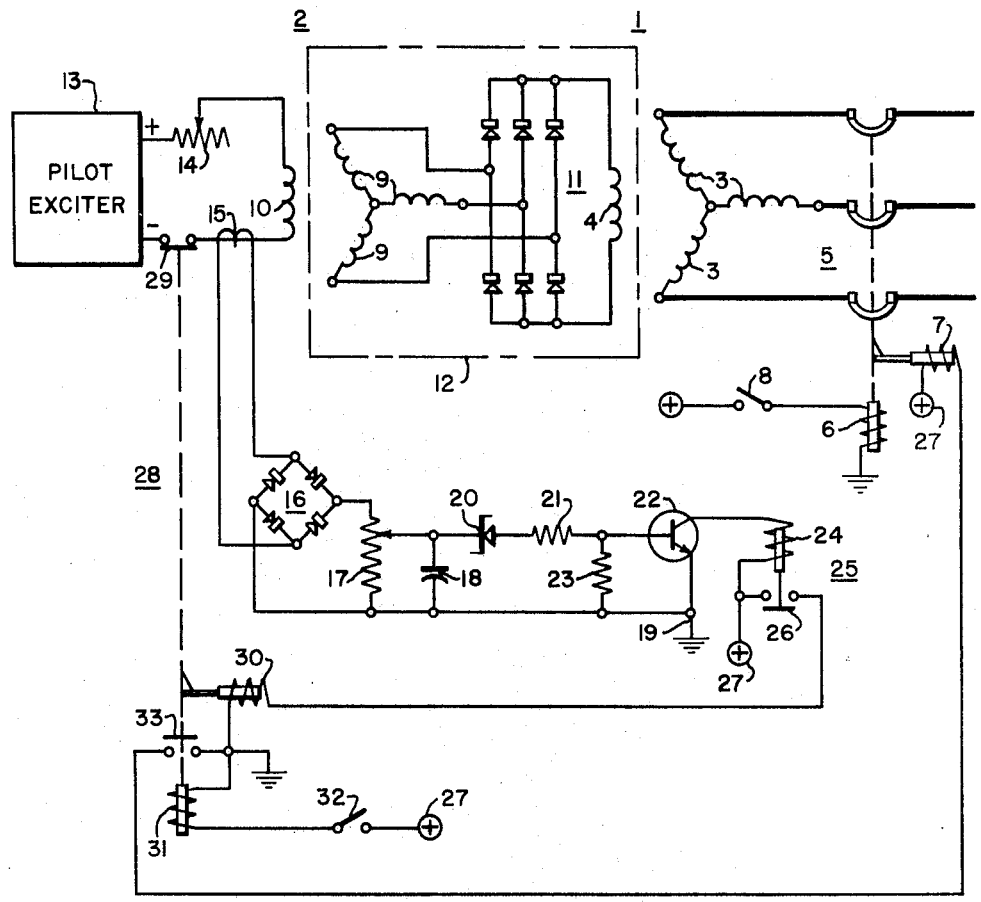

3,210,603
GENERATOR PROTECTION
Wendell Calfee, Lima, James K. Taulbee, Cridersville, and Robert H. Swanberg, Lima, Ohio, assignors to Westinghouse Electric Corporation, Pittsburgh, Pa., a corporation of Pennsylvania
Filed Oct. 8, 1962, Ser. No. 228,940
5 Claims. (Cl. 317—13)

The present invention relates to alternating current generators of the brushless type, and more particularly to the protection of such generators against certain faults in the excitation system.

Alternating current synchronous generators of the brushless type are supplied with field excitation from an alternating current exciter and a rotating rectifier. In such generator systems, the main generator has armature windings on the stator and a field winding on the rotor. An alternating current exciter is provided which has its field winding on the stator and its armature winding on a rotor which is carried on the same shaft as the rotor of the main generator, or is otherwise mounted for rotation with the generator rotor. A rotating rectifier assembly is also mounted on the same shaft, for rotation with the generator and exciter rotors, and is electrically connected between the exciter armature winding and the generator field winding. The stationary exciter field winding is supplied with direct current excitation from any suitable source, which may be independent of the main generator, such as a pilot exciter. In this way, a generator system is provided which requires no commutator or slip rings, and no brushes or sliding contacts.

As in any type of generator, protection must be provided against faults that may occur in service, and the usual protective systems provide adequate protection against most types of faults. In case of failure of one of the diodes of the rectifier assembly, however, an intermittent direct short-circuit is placed across the exciter armature winding, and if the exciter field excitation is maintained, heavy short-circuit currents will flow in the exciter armature winding. Similarly, an insulation failure in the exciter armature winding which causes a short-circuit of a phase winding of the exciter results in heavy short-circuit currents if the exciter field excitation is maintained. In many brushless generator systems, the exciter field excitation is supplied from a pilot exciter, or is otherwise independent of the main generator voltage, and if a rectifier failure or an exciter armature winding short-circuit occurs, the exciter excitation is maintained and the heavy short-circuit currents result in extensive damage or destruction of the exciter and possible damage to the main generator and other system components. In case of a fault of either of these types, therefore, it is necessary to immediately remove excitation from the exciter field winding to prevent such damage, but no protective system has been available heretofore which is capable of detecting these faults and deenergizing the exciter field winding.

The principal object of the present invention is to provide a protective system which effectively protects an alternating current generator of the brushless type against damage resulting from rectifier failure or exciter armature winding insulation failure.

Another object of the invention is to provide a protective system which immediately removes excitation from a brushless alternating current generator system upon the occurrence of a failure in the rectifier assembly or short-circuiting of a phase winding of the exciter armature.

A still further object of the invention is to provide means for detecting a change in the characteristics of a ripple component of the exciter field current of a brushless generator system, which indicates the occurrence of a rectifier failure or an exciter armature winding insulation failure, and for instantaneously interrupting the exciter field winding current in response to such change in the ripple component.

Other objects and advantages of the invention will be apparent from the following detailed description, taken in connection with the accompanying drawing, the single figure of which is a schematic diagram showing an illustrative embodiment of the invention.

The drawing shows a typical embodiment of the invention as applied to the protection of a brushless generator 1 and an exciter 2. The generator 1 may be of any suitable or usual construction and has a three-phase armature winding 3, on the stator member and a field winding 4 carried on the rotor. The generator 1, may be of any suitable construction and is connected to an external circuit by a circuit breaker 5 which is shown as having a closing coil 6 and a trip coil 7. The closing coil 6 may be controlled by a manual switch 8 or in any other desired manner either manual or automatic. The exciter 2 is an alternating current machine and is shown as having a three-phase armature winding 9 which is carried on the rotor of the machine and a field winding 10 which is on the stator. The exciter armature winding 9 is connected to a rectifier assembly 11 which is shown as a three-phase full-wave rectifier bridge although any suitable type of rectifier circuit may be utilized. The rectifier assembly 11 is electrically connected between the exciter armature winding 9 and the generator field winding 4 to supply direct current excitation to the generator field winding.

The rotor of the exciter which carries the armature winding 9, the rectifier assembly 11, and the generator rotor which carries the field winding 4 are all mounted on a common shaft, or are otherwise mechanically connected for rotation together on a common rotating member, as indicated at 12. The exciter field winding 10 is provided with direct current excitation from any suitable direct current source which is shown diagrammatically as a pilot exciter 13. The pilot exciter 13 may, for example, be a permanent magnet generator driven from the main generator shaft, or it may be any other suitable or available source of direct current. The direct current source 13 is preferably connected to the exciter field winding 10 through a voltage regulator, indicated diagrammatically at 14, which may be of any suitable type which is capable of varying the exciter field current to maintain the generator output voltage substantially constant. It will be seen that this typical brushless generator system provides a synchronous alternating current generator which requires no commutator, slip rings, or brushes.

As previously indicated, such a generator must be protected against the various types of faults which may occur in service. The present invention is particularly concerned with protection against two types of excitation system faults. It will be seen that if one of the semiconductor diodes of the rectifier assembly 11 fails and becomes short-circuited, an intermittent short-circuit occurs across the exciter armature winding. If an insulation failure occurs in the exciter armature winding which causes a phase winding of the exciter to be short-circuited, the effect is similar except that a continuous short-circuit exists across the phase winding involved. In either case, if the excitation of the exciter field winding is maintained, the exciter voltage will cause heavy short-circuit currents to flow in the exciter armature winding and serious damage to the exciter and generator will result.

In a system such as that shown in the drawing, in which the excitation is supplied by a pilot exciter, the exciter field excitation is independent of the main generator voltage and will be maintained under fault conditions so that either of the types of faults described may lead to serious damage or destruction of the exciter and possibly the main generator and other system components. This will be true with any type of excitation system which is independent of the main generator voltage, and the invention is applicable to brushless generators having any such type of excitation system for the exciter field winding.

In accordance with the present invention, means are provided for detecting the occurrence of a fault of either of the types described and immediately interrupting the exciter field winding current. In the operation of an alternating current machine such as the exciter 2, the armature reaction due to the current in the armature winding is reflected across the air gap and produces an alternating current ripple superimposed on the direct current in the field winding circuit. In normal operation, this ripple component of the field current has a frequency which is equal to six times the frequency of the exciter voltage with a three-phase full-wave rectifier circuit such as that shown, or three times the exciter frequency for a three-phase half-wave rectifier circuit. When a failure occurs in the rectifier assembly or in the exciter armature winding, resulting in a short-circuited phase winding in the exciter as described above, the magnitude of the ripple component is substantially increased while the frequency is reduced to the frequency of the exciter generated voltage.

This change in the characteristics of the ripple component of the exciter field current is utilized for detecting the occurrence of faults of the types described. For this purpose, a current transformer 15 is connected in the exciter field winding circuit to sense the ripple component of the field current. The secondary of the current transformer 15 is connected to a full-wave rectifier bridge 16 and the direct current output of the rectifier bridge 16 is connected across a potentiometer 17, a filter capacitor 18 preferably also being connected across the potentiometer. The rectified and filtered voltage across the potentiometer 17 represents the ripple component of the exciter field winding current, and its magnitude is substantially changed in response to a significant change in the magnitude or frequency of the ripple component. This voltage therefore can be used as a signal to indicate the occurrence of a rectifier failure or exciter armature winding insulation failure, and can be utilized to effect interruption of the exciter field winding current.

One side of the potentiometer 17 is preferably connected to ground at 19 and an adjustable part of the voltage across the potentiometer is applied to a Zener diode 20. The Zener diode 20 is connected through a current limiting resistor 21 to the base of a transistor 22. The emitter of the transistor 22 is connected to ground 19 and a bias resistor 23 may be connected across the base and emitter. The collector of the transistor 22 is connected to the operating coil 24 of a relay 25 which has a normally open contact 26, the other end of the relay coil 24 being connected to any suitable source of direct current control power indicated at 27.

The excitation circuit of the exciter 2 is controlled by a field relay or generator control relay 28 which has a contact 29 connected in series with the exciter field winding 10. The relay 28 is shown as being a latch type relay having a trip coil 30 and a closing coil 31. The closing coil 31 may be energized from the direct current source 27 by means of a manual switch 32 or by any desired manual or automatic means. The trip coil 30 of the relay 28 is connected to the contact 26 of the relay 25 to be energized from the source 27 when the relay contact 26 closes. The relay 28 preferably also has a contact 33 which is connected, as shown, to energize the trip coil 7 of the circuit breaker 5 when the contact 33 closes. It will be understood that the control relay 28 may be of any suitable type and may be controlled by any desired additional manual or automatic means.

The operation of this protective system should now be apparent. During normal operation the magnitude of the ripple component of the exciter field winding current is relatively small and its frequency is relatively high, as explained above. The voltage across the potentiometer 17, therefore, is relatively low and is below the breakdown voltage of the Zener diode 20 so that no base current flows to the transistor 22. The transistor 22 is therefore non-conductive and the relay 25 is not energized. Upon the occurrence of a rectifier failure or an exciter armature winding insulation failure, the magnitude of the ripple component increases and its frequency decreases, so that the output of the current transformer 15 increases and the voltage across the potentiometer 17 is substantially increased. The potentiometer 17 is adjusted so that upon an increase in the voltage indicating the occurrence of a fault as described, the voltage will exceed the breakdown voltage of the Zener diode 20 which becomes conductive. Base current then flows to transistor 22 making it conductive, so that the relay 25 is energized and closes its contact 26. When the contact 26 closes, an energizing circuit for the trip coil 30 of the control relay 28 is completed and the relay 28 is tripped and opens its contact 29 to interrupt the exciter field current and remove excitation from the exciter. Preferably, the generator breaker 5 is also tripped by closure of the control relay contact 33. In this way, the occurrence of excitation faults of the types described is detected by the change in characteristics of the ripple component of the exciter field current, and field excitation is instantaneously removed from the exciter to prevent the occurrence of excessive short-circuit currents in the armature winding and the damage resulting therefrom.

It will be seen that a protective system is thus provided which affords rapid and reliable protection against faults of a type for which no effective protection has previously been available. The protective system is relatively simple, utilizing compact and reliable components which can be located at any desired point which may be remote from the generator itself. The operation of the system is very rapid so that excitation is removed before extensive damage can occur to the exciter or to the generator or other components of the system. It will also be noted that the system is inherently selective if the generator 1 is being operated in parallel with other generators, since only the faulted generator will be affected.

A preferred embodiment of the invention has been shown and described, but it is to be understood that this embodiment is illustrative only and that various changes and modifications may be made. Thus, the particular sensing circuit shown is only illustrative and any circuit which will respond sufficiently fast to changes in the exciter field current wave form may be utilized. Similarly, other changes may be made and other embodiments are possible within the scope of the invention, and the invention is not limited to the specific circuit shown for the purpose of illustration.

We claim as our invention:

1. In combination, an alternating current generator having a stationary armature member and a rotatable member carrying a field winding, an exciter having a stationary member carrying a field winding and an armature member rotatable with said rotatable member of the generator, rectifier means mounted for rotation with said rotatable member and electrically connected between the exciter armature member and the generator field winding to supply direct current excitation thereto, means for supplying direct current to said exciter field winding, and current sensing means responsive to a ripple component of said exciter field current for effecting interruption of the exciter field current in response to a predetermined change in the characteristics of the ripple component.

2. In combination, an alternating current generator having a stationary armature member and a rotatable member carrying a field winding, an exciter having a stationary member carrying a field winding and an armature member rotatable with said rotatable member of the generator, rectifier means mounted for rotation with said rotatable member and electrically connected between the exciter armature member and the generator field winding to supply direct current excitation thereto, means for supplying direct current to said exciter field winding, and current sensing means responsive to a ripple component of said exciter field current for effecting interruption of the exciter field current in response to a predetermined change in magnitude and frequency of the ripple component.

3. In combination, an alternating current generator having a stationary armature member and a rotatable member carrying a field winding, an exciter having a stationary member carrying a field winding and an armature member rotatable with said rotatable member of the generator, rectifier means mounted for rotation with said rotatable member and electrically connected between the exciter armature member and the generator field winding to supply direct current excitation thereto, means for supplying direct current to said exciter field winding, current sensing means for sensing a ripple component of said exciter field current, and means responsive to a predetermined change in the characteristics of the ripple component for effecting interruption of the exciter field current.

4. In combination, an alternating current generator having a stationary armature member and a rotatable member carrying a field winding, an exciter having a stationary member carrying a field winding and an armature member rotatable with said rotatable member of the generator, rectifier means mounted for rotation with said rotatable member and electrically connected between the exciter armature member and the generator field winding to supply direct current excitation thereto, means for supplying direct current to said exciter field winding, a current transformer connected in the circuit of the exciter field winding to sense a ripple component of the exciter field current, and means responsive to the output of said current transformer for effecting interruption of the exciter field current upon a predetermined change in the current transformer output.

5. In combination, an alternating current generator having a stationary armature member and a rotatable member carrying a field winding, an exciter having a stationary member carrying a field winding and an armature member rotatable with said rotatable member of the generator, rectifier means mounted for rotation with said rotatable member and electrically connected between the exciter armature member and the generator field winding to supply direct current excitation thereto, means for supplying direct current to said exciter field winding, a current transformer connected in the circuit of the exciter field winding to sense a ripple component of the exciter field current, means for rectifying the output of the current transformer, and means for effecting interruption of the exciter field current when the rectified output voltage of the current transformer exceeds a predetermined value.

References Cited by the Examiner
UNITED STATES PATENTS

| | | | |
|---|---|---|---|
| 1,867,416 | 7/32 | Merrick | 317—13 |
| 2,722,652 | 11/55 | Brainard | 310—68.4 |
| 3,020,462 | 2/62 | MacGregor | 317—13 |
| 3,030,531 | 4/62 | Lessmann | 317—13 |

SAMUEL BERNSTEIN, *Primary Examiner.*